US009248682B2

(12) United States Patent
Stecker

(10) Patent No.: US 9,248,682 B2
(45) Date of Patent: Feb. 2, 2016

(54) METHODS OF PRODUCING ARTICLES HAVING THREE-DIMENSIONAL TOPOGRAPHY

(71) Applicant: Alchemy Dimensional Graphics, LLC, Hillsborough, NC (US)

(72) Inventor: William M. Stecker, Hillsborough, NC (US)

(73) Assignee: Identity Group Holdings Corporation, Nashville, TN (US)

( * ) Notice: Subject to any disclaimer, the term of this patent is extended or adjusted under 35 U.S.C. 154(b) by 285 days.

(21) Appl. No.: 13/854,533

(22) Filed: Apr. 1, 2013

(65) Prior Publication Data
US 2014/0290511 A1  Oct. 2, 2014

(51) Int. Cl.
| B41M 1/12 | (2006.01) |
| B41M 7/00 | (2006.01) |
| B41F 15/12 | (2006.01) |
| H04N 1/405 | (2006.01) |
| B44C 3/04 | (2006.01) |
| B41F 15/08 | (2006.01) |
| B41L 13/12 | (2006.01) |

(52) U.S. Cl.
CPC .............. *B41M 1/12* (2013.01); *B41F 15/0804* (2013.01); *B41F 15/12* (2013.01); *B41M 7/009* (2013.01); *B44C 3/048* (2013.01); *H04N 1/405* (2013.01); *B41L 13/12* (2013.01)

(58) Field of Classification Search
CPC ..... B41F 15/12; B41F 15/0804; B44C 3/048; B41L 13/12
See application file for complete search history.

(56) References Cited

U.S. PATENT DOCUMENTS

| 4,675,216 | A | | 6/1987 | DuForest et al. | |
| 5,840,142 | A | * | 11/1998 | Stevenson et al. | ............ 156/237 |
| 6,092,464 | A | * | 7/2000 | Meola et al. | .................. 101/129 |
| 8,136,447 | B2 | | 3/2012 | Gochenauer et al. | |
| 8,399,052 | B2 | * | 3/2013 | Stecker | ......................... 427/202 |

OTHER PUBLICATIONS

Brennan, "How to separate gradients for screen printing using half-tones," Nov. 10, 2010, downloaded from the internet on the Wayback Machine: https://web.archive.org/web/20101119050146/http://www.3roadsmedia.com/blog/how-to-separate-gradients-for-screen-printing-using-halftones.*

* cited by examiner

*Primary Examiner* — Justin Olamit
(74) *Attorney, Agent, or Firm* — Myers Bigel Sibley & Sajovec

(57) ABSTRACT

A method of making a bas relief from a two-dimensional image includes converting a two-dimensional image to a gray-scale image that comprises a plurality of shades of gray. Each shade of gray corresponds to a respective elevation of a three dimensional representation of the two-dimensional image. The gray-scale image is then converted to a half-tone bitmap image that is etched onto a print screen stencil. Meltable powder is forced through the open mesh areas of the print screen stencil to form a three-dimensional pattern of powder on a substrate positioned beneath the print screen stencil in spaced-apart relationship therewith. The three-dimensional pattern of the powder corresponds to the three-dimensional representation of the two-dimensional image. The three-dimensional pattern of powder is then heated to fuse the powder together to form a bas relief.

20 Claims, 10 Drawing Sheets

METHODS OF PRODUCING ARTICLES HAVING THREE-DIMENSIONAL TOPOGRAPHY

FIELD OF THE INVENTION

The present invention relates generally to decorative articles and, more particularly, to methods of making decorative articles.

BACKGROUND

The creation of an article with a low relief, three-dimensional image, also known as a bas relief, is conventionally performed by one of the following four methods. The first method involves creating an image by removing material from an article, for example, by sculpting. Alternatively, a machine may be employed to route, mill or laser away material leaving a desired three-dimensional topography. Duplication machinery, such as pantographs and multiple spindle machining centers can increase production rates, but are commercially limited to low volume production. The size of the resulting bas relief typically is limited by the dimensions of a duplication machine's operating range or bed size.

A second conventional method of producing a bas relief is via the use of a mold. Typically, a mold from which a bas relief is cast is made manually (e.g., by an artist). Molds are typically used in producing bas relief made from metal, clay, brick, and the like.

A third conventional method of producing a bas relief is via embossing. Embossing is a procedure where pressure is used to deform a material to create a three dimensional relief therein. This method may be used to produce bas relief in plastics, leather, cloth, sheet metal, clay, and the like.

A fourth conventional method of producing a bas relief is via direct deposition of polymer material on a surface, for example, under computer control. Polymer material may be applied as a liquid and dried or, alternatively, polymer material may be applied as a liquid and then polymerized (i.e., cured) with targeted energy.

Unfortunately, all of these conventional methods have cost and size limitations. In the case of direct creation, size may be limited by the machine used to remove material from an article to create a three dimensional topography. In the case of molding or embossing, the size of a bas relief is limited by the equipment involved. The cost of molds and embossing tools typically goes up exponentially as size increases, as does the size and cost of the machine necessary to employ the mold or embossing medium.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a method of making a bas relief from a two-dimensional image includes converting a two-dimensional image to a gray-scale image that comprises a plurality of shades of gray, wherein each shade of gray corresponds to a respective elevation of a three dimensional representation (i.e., three dimensional topography) of the two-dimensional image. The gray-scale image is then converted to a half-tone bitmap image that comprises a plurality of dark dots on a light background. Each dark dot of the half-tone bitmap image represents a respective pixel in the gray-scale image, and each dark dot has a size that corresponds to a respective one of the shades of gray in which the respective pixel is located. For example, in some embodiments, the lightest shade of gray (i.e., white) may represent the lowest elevation of the three dimensional representation, and the darkest shade of gray (i.e., black) may represent the highest elevation of the three dimensional representation. Alternatively, in some embodiments, the lightest shade of gray (i.e., white) may represent the highest elevation of the three dimensional representation, and the darkest shade of gray (i.e., black) may represent the lowest elevation of the three dimensional representation. The shades of gray in between the lightest and darkest shades of gray correspond to respective different elevations between the highest and lowest elevations.

The half-tone bitmap image is then etched onto a print screen stencil such that the print screen stencil has open mesh areas that correspond with the plurality of dark dots and closed mesh areas that correspond with the light background of the half-tone bitmap image. For example, if black areas in the gray-scale image represent the highest elevation, the mesh areas that correspond to the black areas of the gray-scale image have unrestricted pass through capability for powder (i.e., the apertures in these mesh areas have not been blocked so as to restrict powder passing therethrough). Similarly, if white areas in the gray-scale image represent the lowest elevation, the corresponding mesh areas of the screen are blocked completely so as to not allow any powder to pass therethrough (i.e., the apertures in these mesh areas are completely blocked so as to prevent powder passing therethrough). The apertures in the remaining mesh areas have a pass through size that corresponds to a shade of gray in the corresponding gray-scale image (i.e., the amount that an aperture is blocked corresponds to a shade of gray in the gray-scale image).

Meltable powder is gently forced through the open mesh areas of the print screen stencil to form a three-dimensional pattern of powder on a substrate positioned beneath the print screen stencil in spaced-apart relationship therewith. The three-dimensional pattern of the powder corresponds to the three-dimensional representation of the two-dimensional image. The three-dimensional pattern of powder is then heated to fuse the powder together to form a bas relief.

In some embodiments, the original two-dimensional image may be printed, in accurate registration, onto the bas relief. If the two-dimensional image is a color image, the printing of the image onto the bas relief in exact registration provides color to the bas relief. Printing of the two-dimensional image may be performed via a flat-bed printer, for example.

In some embodiments, the bas relief can be subjected to various finishing operations. Exemplary finishing operations include, but are not limited to, polishing, buffing, sanding, and/or chemical treatment. In some embodiments, a protective coating may be applied to the bas relief. In some embodiments a protective film may be applied and fused onto the bas relief.

In some embodiments, etching the half-tone bitmap image onto the print screen stencil includes printing the half-tone image on a film to produce a positive rendering (i.e., a "film positive") of the half-tone image. The film is then used to photographically etch the half-tone bitmap image onto the print screen stencil.

In some embodiments, the powder is a single homogenous material. In other embodiments, the powder is a mixture of different powders, at least one of which is meltable.

In some embodiments, the powder is a thermosetting plastic powder. Exemplary thermosetting plastic powders may include, but are not limited to, polyester powder, epoxy powder, urethane powder, silicone powder, polytetrafluoroethylene (PTFE) powder, and the like.

In some embodiments, the powder is a thermoplastic powder. Exemplary thermoplastic powders may include, but are not limited to, polyvinyl chloride powder, nylon powder, acrylic powder, and the like.

In some embodiments, the powder is an inorganic powder. Exemplary inorganic powders may include, but are not limited to, glass, ceramic, silica, metal, and the like.

In some embodiments, the powder is an organic powder. Exemplary organic powders may include sugar, salt, and the like.

In some embodiments, the powder may be a mixture of two or more of the following: thermosetting plastic powder, thermoplastic powder, inorganic powder, and organic powder.

According to some embodiments of the present invention, a method of making a bas relief from a two-dimensional color image includes converting the two-dimensional color image to four respective gray-scale images, each corresponding to a respective color, each comprising a plurality of shades of gray, wherein each shade of gray corresponds to a respective elevation of a three dimensional representation of the two-dimensional color image. The four gray-scale images are converted to four respective half-tone bitmap images that each comprise a plurality of dark dots on a light background, wherein each dark dot represents a respective pixel in the gray-scale image, and wherein each dark dot has a size that corresponds to a respective one of the shades of gray in which the respective pixel is located.

The four half-tone bitmap images are then etched onto four respective print screen stencils such that each print screen stencil has open mesh areas that correspond with the plurality of dark dots and closed mesh areas that correspond with the light background of the respective half-tone bitmap image. For example, if black areas in the gray-scale image represent the highest elevation, the mesh areas that correspond to the black areas of the gray-scale image have unrestricted pass through capability for powder (i.e., the apertures in these mesh areas have not been blocked so as to restrict powder passing therethrough). Similarly, if white areas in the gray-scale image represent the lowest elevation, the corresponding mesh areas of the screen are blocked completely so as to not allow any powder to pass therethrough (i.e., the apertures in these mesh areas are completely blocked so as to prevent powder passing therethrough). The apertures in the remaining mesh areas have a pass through size that corresponds to a shade of gray in the corresponding gray-scale image (i.e., the amount that an aperture is blocked corresponds to a shade of gray in the gray-scale image).

Meltable powder is forced through the open mesh areas of each print screen stencil separately to form a three-dimensional pattern of powder on a substrate positioned beneath the print screen stencil in spaced-apart relationship therewith, wherein the three-dimensional pattern of the powder corresponds to the three-dimensional representation of the two-dimensional image. The three-dimensional pattern of powder is then heated to fuse the powder together to form a bas relief.

In some embodiments, the original two-dimensional color image may be printed, in accurate registration, onto the bas relief. Printing of the two-dimensional image may be performed via a flat-bed printer, for example.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

DETAILED DESCRIPTION

Figure 1:
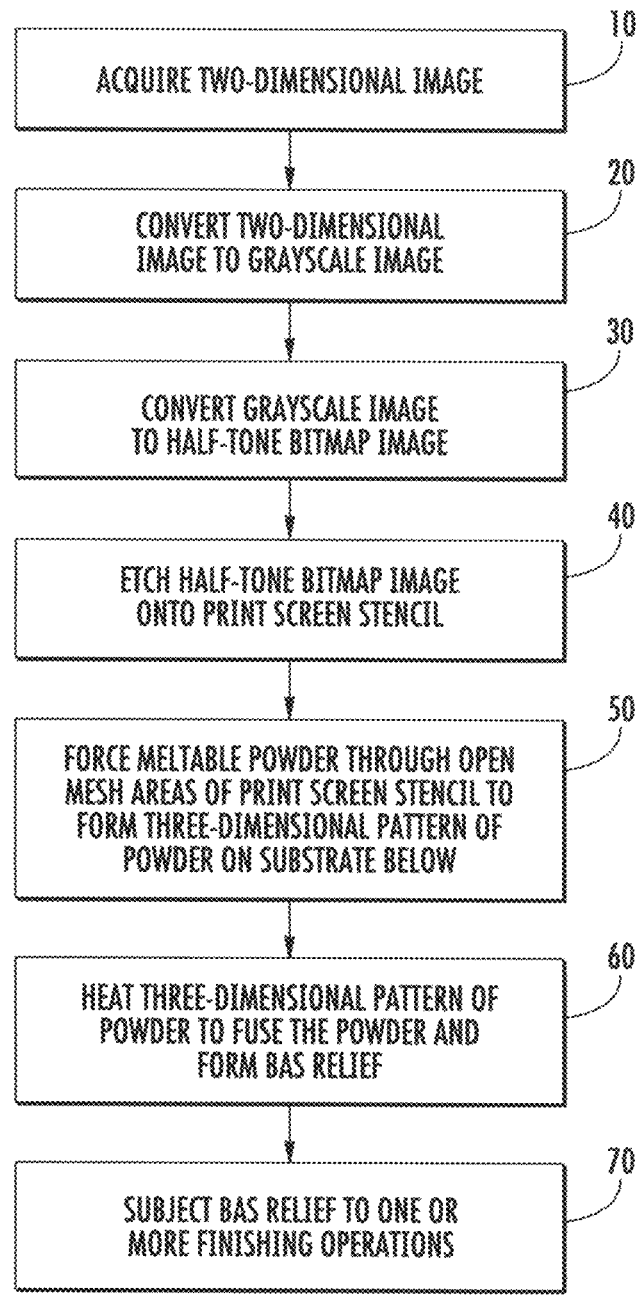
FIG. 1 is a flowchart of operations for making articles having three-dimensional relief, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary by +/−twenty percent (20%).

The term "bas relief", as used herein, refers to an article having three-dimensional topography projecting outwardly from a background.

The term "image", as used herein, means a visual representation of something, whether in black and white or in color, and includes any type of image acquired or created in any manner. An image may be created, copied and stored in electronic form, and can be, for example, a vector image file or a raster image file. A raster image is a digital image that is created (for example, taking a photograph) or captured (for example, scanning an existing photograph) as a set of samples of a given space. A raster image includes a grid of x and y coordinates on a display space. A raster image file identifies which of these coordinates to illuminate in monochrome or color values. A raster file is sometimes referred to as a bitmap file because the raster file contains information that is directly mapped to a display grid. Examples of raster image file types include, but are not limited to, BMP, TIFF, GIF, and JPEG files. Vector image files use geometrical elements, such as points, lines, curves, and shapes or polygon(s), to represent images in computer graphics. Vector image files are stored as mathematical expressions as opposed to raster image files which are stored as a series of mapped "dots", also known as pixels. The terms "image" and "graphic image", as used herein, are interchangeable.

The terms "topography", "three-dimensional topography", and "three-dimensional relief", as used herein, are interchangeable.

Figure 2:
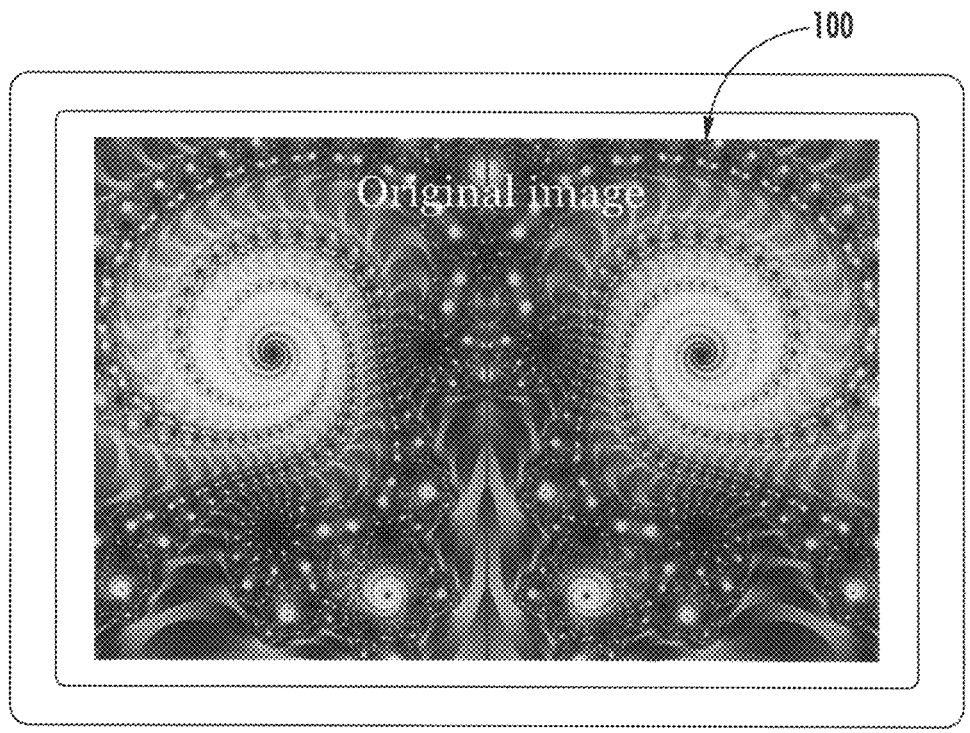
FIG. 2 illustrates an exemplary color graphic image that may be converted into a gray-scale image, according to some embodiments of the present invention.
Figure 3:
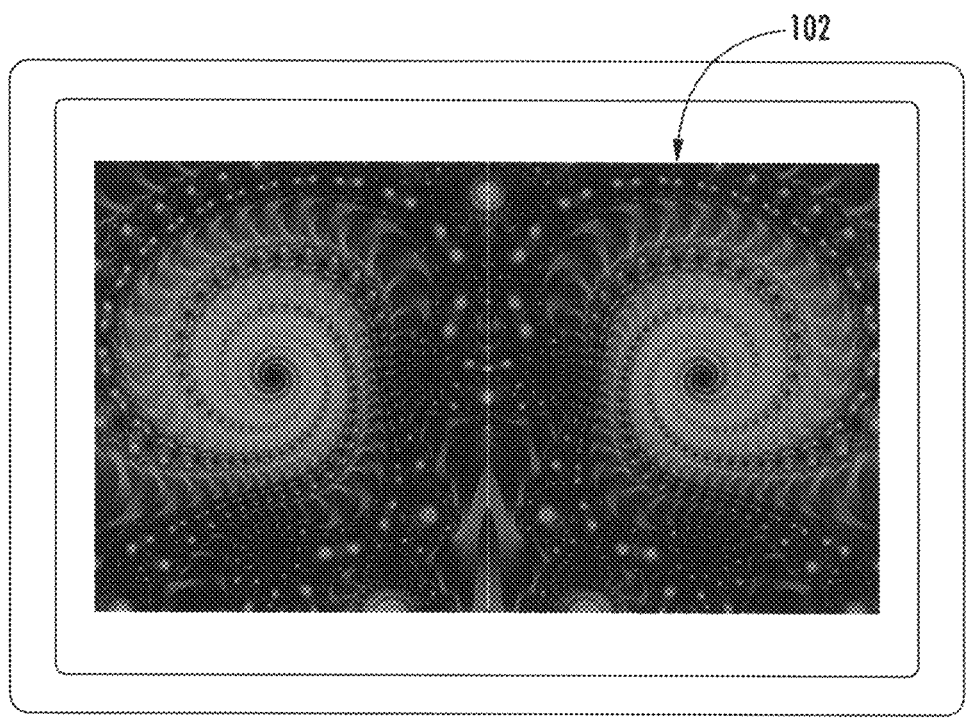
FIG. 3 illustrates the color graphic image of FIG. 2 converted to a gray-scale image.

Referring now to the figures, methods of making decorative articles having printed and embossed surfaces, according to some embodiments of the present invention, will be described. Initially, a two-dimensional image is acquired (Block 10, FIG. 1). Any type of image may be utilized. For example, the image may be photographic image, an art work, a computer generated image, etc. The image may be originally digitized with a camera or may be converted to digital format via scanning. Next, the acquired two-dimensional image is converted into a two-dimensional gray-scale image (Block 20, FIG. 1). FIG. 2 illustrates an acquired two-dimensional color image 100 and FIG. 3 is a gray-scale image 102 of the original image 100 of FIG. 2.

The conversion of the acquired image 100 to a gray-scale image may be performed using any type of image editing program. An exemplary image editing program is Photoshop®, available from Adobe Systems, Inc., San Jose, Calif. However, various other image editing programs may be used without limitation. In the gray-scale image, which is similar to a black and white photograph, the grey value of each pixel will represent a respective elevation in a desired three-dimensional topography. For example, the darkest areas in the gray-scale image are areas which may represent the highest elevation in the three-dimensional relief, and the lightest areas may represent the lowest elevation areas in the three-dimensional relief. The shades of gray in between the lightest and darkest areas correspond to respective different elevations between the highest and lowest elevations.

The acquired image (100, FIG. 2) may undergo various detailed and/or artistic modifications prior to conversion to a gray-scale image. Similarly, the gray-scale image may be subjected to various detailed and/or artistic modifications.

In an alternative embodiment, the gray-scale image may be entirely computer generated based on pixels. For example, graphic artists may use digital tools such as "crops", "brushes", and "filters" to create and manipulate raster images.

After the gray-scale image 102 (FIG. 3) is created, it is converted to a half-tone bitmap format (Block 30, FIG. 1). As known to those skilled in the art, a bitmap is an image based on black dots on a white background. Half-tone images are the images typically seen in a newspaper black and white print picture. Careful examination will show that the images are created by dot density. Dot matrix printers, which were the predecessors to today's inkjet and laser printers, created dot patterns to produce half-tone bitmap images. Conventional inkjet printers also use dot placement to create images by having enough "bleed" to blend the dots.

The half-tone image 106 (FIG. 4) is then printed on a clear film 104 (FIG. 4), referred to as a "film positive", and a silk screen stencil is prepared using the film positive (Block 40, FIG. 1). A silk screen stencil frame, typically wood, aluminum, or other fairly rigid material, is selected based on the size of the intended substrate that will have the three-dimensional relief formed thereon. A meshed screen is stretched tightly over the frame. The dimensions of the silk screen portion overlying the frame are typically at least several inches larger than the substrate on which the bas relief is to be formed. Screen material is available in a wide variety of meshes. The mesh size identifies the size of the apertures or openings in the screen. For example, a 100-mesh screen has one hundred openings per inch in each direction (i.e., a 100-mesh screen has ten thousand openings per square inch, etc.). Screens of various mesh sizes may be utilized. Embodiments of the present invention are not limited to any particular size or mesh of a screen to be used as a stencil.

In preparing the silk screen stencil, an ultra-violet (UV) light-sensitive emulsion is applied to the screen and allowed to dry. The film positive film 104 (FIG. 4) is then placed in tight physical contact with the emulsion-coated screen and placed in a UV cure machine. The machine generates a high intensity UV light which polymerizes those parts of the coated screen not protected by the black dots which encoded the half-tone image. The screen is then "washed" to remove uncured emulsion from the screen. The resulting "screen" has pass-through openings corresponding to the placement of dark dots in the half-tone image. The screen is then placed in adjacent, spaced-apart relationship with a substrate selected for the purpose. Typically, the space between the silk screen stencil and the substrate is one fourth of an inch. However, other dimensions may be utilized without limitation.

Figure 4:
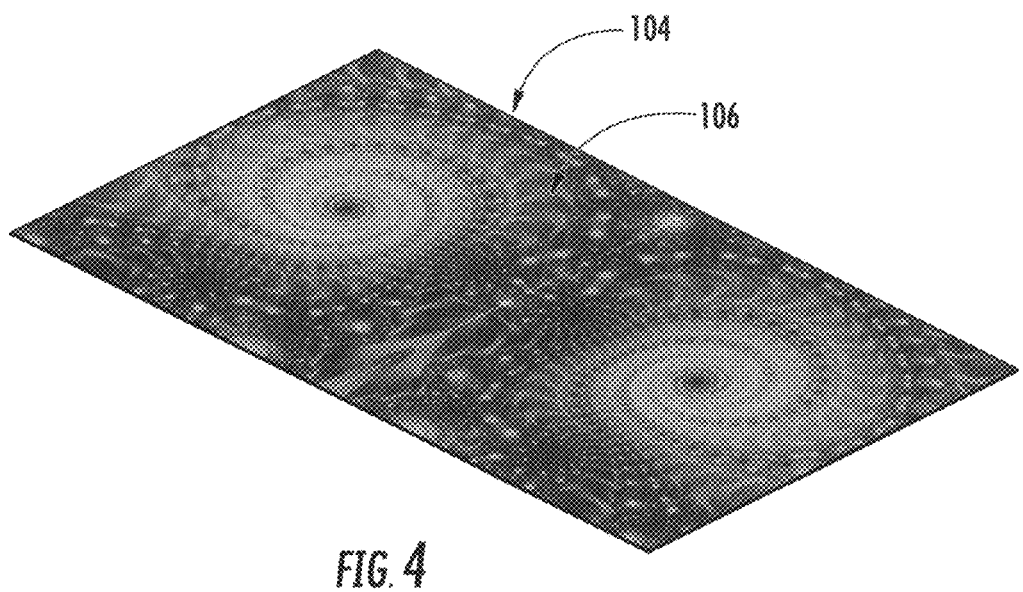
FIG. 4 illustrates a film having a positive image of the gray-scale image of FIG. 3 thereon for use in preparing a print screen stencil, according to some embodiments of the present invention.
Figure 5:
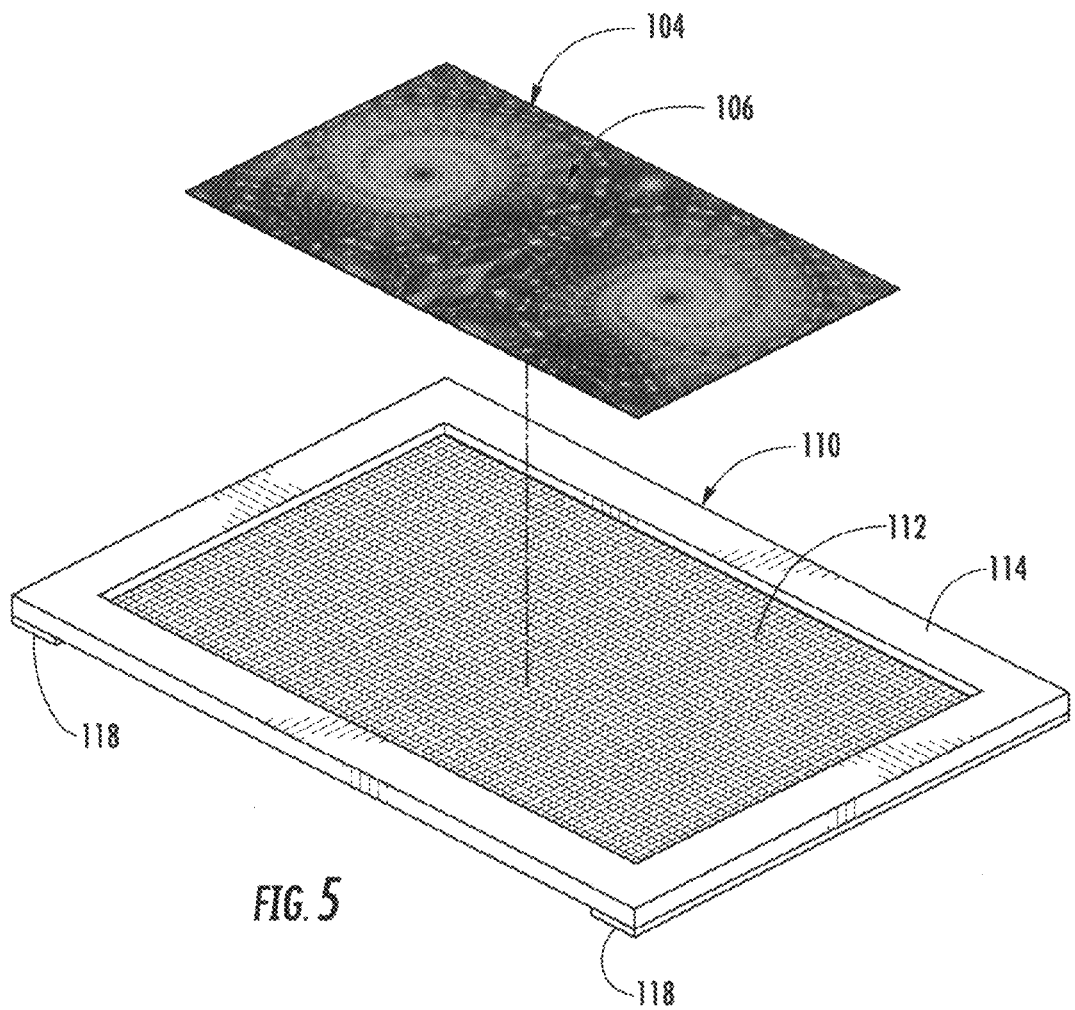
FIG. 5 illustrates a print screen stencil and the gray-scale image of FIG. 3 being applied thereto via the film of FIG. 4.
Figure 6:
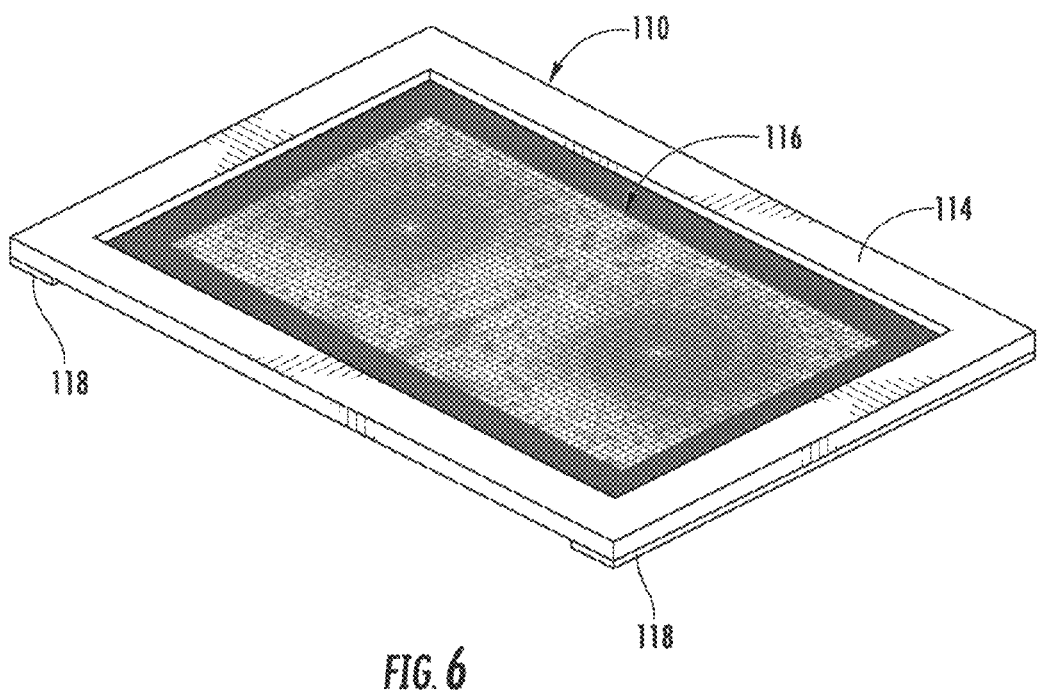
FIG. 6 illustrates the print screen stencil of FIG. 5 having the gray-scale image of FIG. 3 thereon.

An exemplary silk screen stencil 110 is illustrated in FIGS. 5-8. The silk screen stencil 110 includes a screen 112 secured to a frame 114. FIG. 5 illustrates the silk screen stencil 110 prior to the image being generated on the screen 112. In FIG. 6, the screen 112 has a polymerized coating 116 thereon, as described above, that corresponds to the half-tone image 106 on the film positive film 104 (FIG. 4). The coating 116 includes the pass-through openings that correspond to the placement of dots in the half-tone image 106 on the film 104. The illustrated silk screen stencil 110 includes spacers 118 on the bottom thereof that are configured to maintain the silk screen 112 in spaced-apart relationship with an underlying substrate 120. Various ways may be utilized to maintain space between the screen 112 and the substrate 120. Embodiments of the present invention are not limited to the illustrated use of spacers 118 for maintaining space between the screen 112 and the substrate 120.

Figure 7:
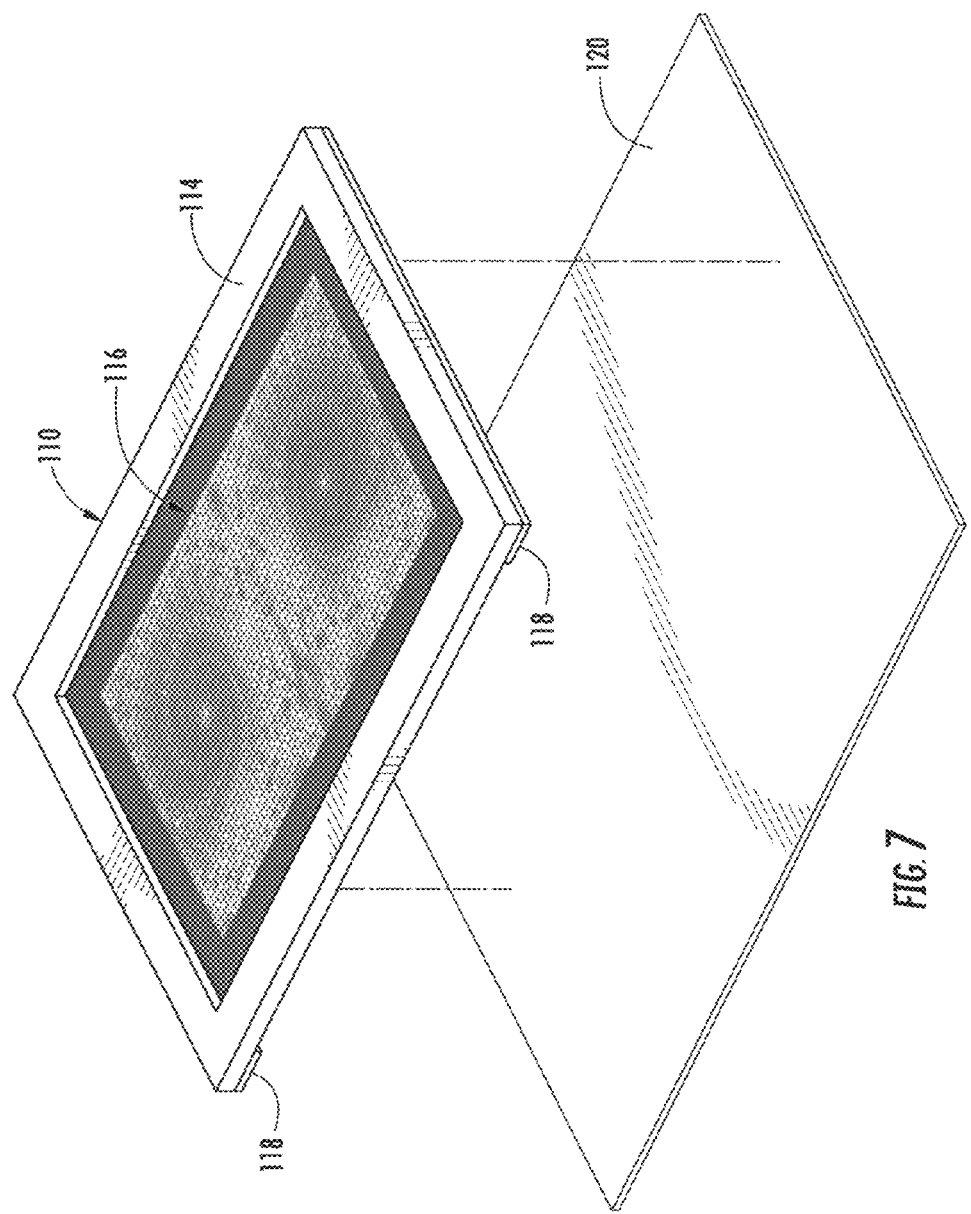
FIG. 7 illustrates the print screen stencil of FIG. 5 having the gray-scale image of FIG. 3 thereon, and a substrate upon which powder is to be applied using the print screen stencil.
Figure 8:
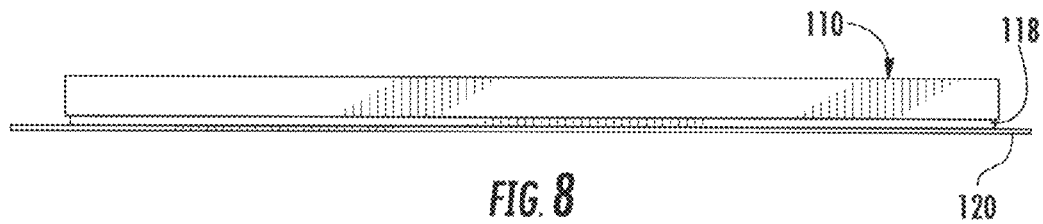
FIG. 8 is a side view of the print screen stencil of FIG. 5 in overlying, spaced-apart relationship with the substrate of FIG. 7, according to some embodiments of the present invention.
Figure 9:
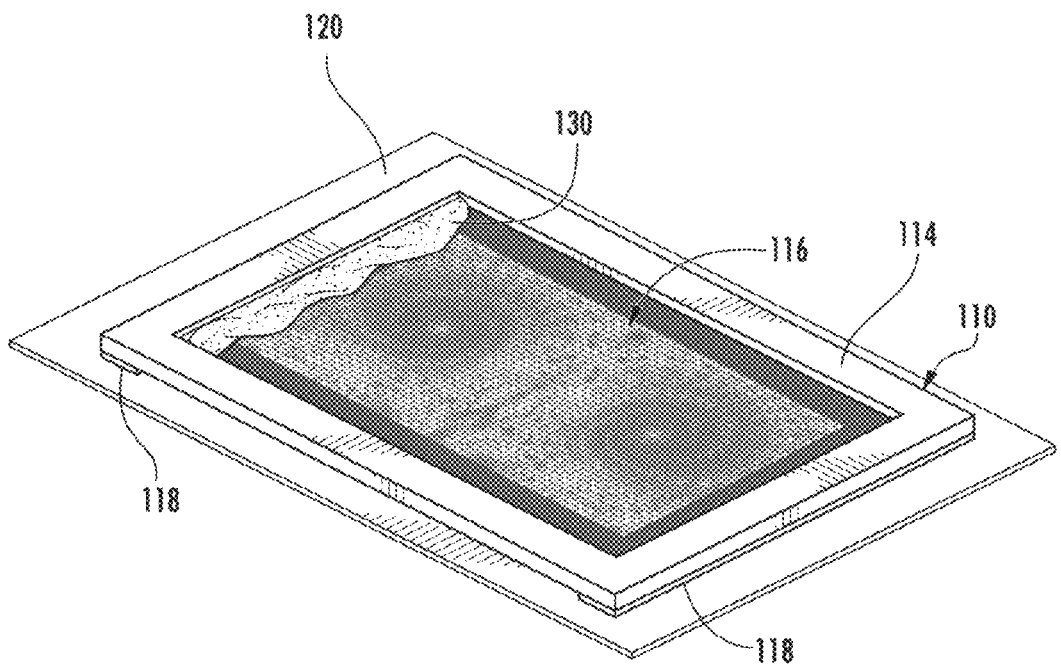
FIG. 9 is a top perspective view of the print screen stencil of FIG. 5 in overlying, spaced-apart relationship with the substrate of FIG. 7, according to some embodiments of the present invention.

Referring to FIGS. 7-9, the silk screen stencil 110 is placed in spaced-apart relationship with the substrate 120. The substrate 120 will receive powder will through the screen 112 to form a three-dimensional relief. Silk screen stencils according to embodiments of the present invention may have various shapes, sizes and/or configurations. Embodiments of the present invention are not limited to the illustrated print screen stencil 110.

The substrate 120 is selected so as to tolerate a processing temperature (i.e., melt-point) of the powder. In addition, the substrate 120 is chosen for its ability to be bonded to the melting powder. The bond may be adhesive (as with thermoset or thermoplastic powders) or fusible (as with glass on glass or metal on metal) in nature. Substrates according to embodiments of the present invention can be formed from a variety of materials and can have virtually any size, shape and/or configuration. Exemplary substrate materials include, but are not limited to, metals, glass, polymeric materials, composite materials, foamed materials, wood, etc. Embodiments of the present invention are not limited to the illustrated substrate 120.

Figure 10:
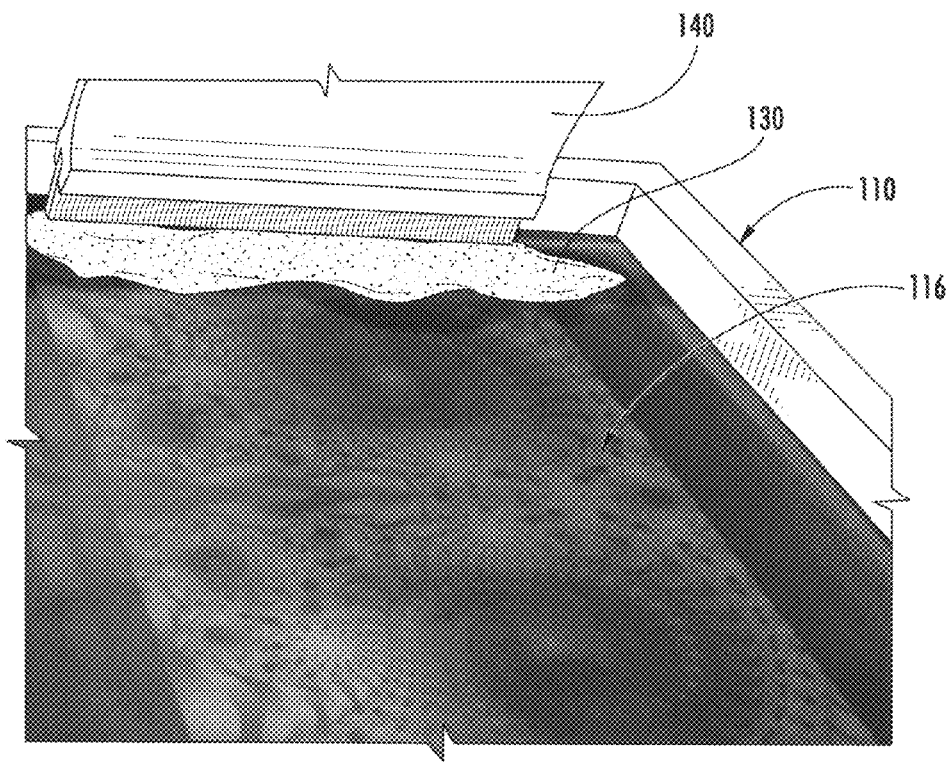
FIG. 10 illustrates a powder being forced through the open mesh areas of the print screen stencil to form a three-dimensional pattern of powder on the substrate positioned therebeneath.

Powder 130 is then forced through the open mesh areas of the polymerized coating 116 on the screen 112 of the print screen stencil 110 to form a three-dimensional pattern of powder on the substrate 120 below (Block 50, FIG. 1). FIG. 10 illustrates the use of a squeegee or doctor blade 140 to force powder 130 through the open mesh areas of the polymerized coating 116 on the screen 112, as would be understood by those skilled in the art of silk screen printing. The powder 130 is pushed in mass across the screen 112 with the doctor blade 140. The powder 130 becomes deposited on the substrate 120 corresponding to the density of the pass-through areas of the polymerized coating 116 on the screen 112, which in turn corresponds to the original gray-scale image 102 (FIG. 3). Successive passes of the doctor blade 140 will deposit likewise sorted quantities of powder 130 in precise agreement with the half-tone image. The powder 130 builds in piles with gradients in agreement with the desired three-dimensional relief.

Figure 11:
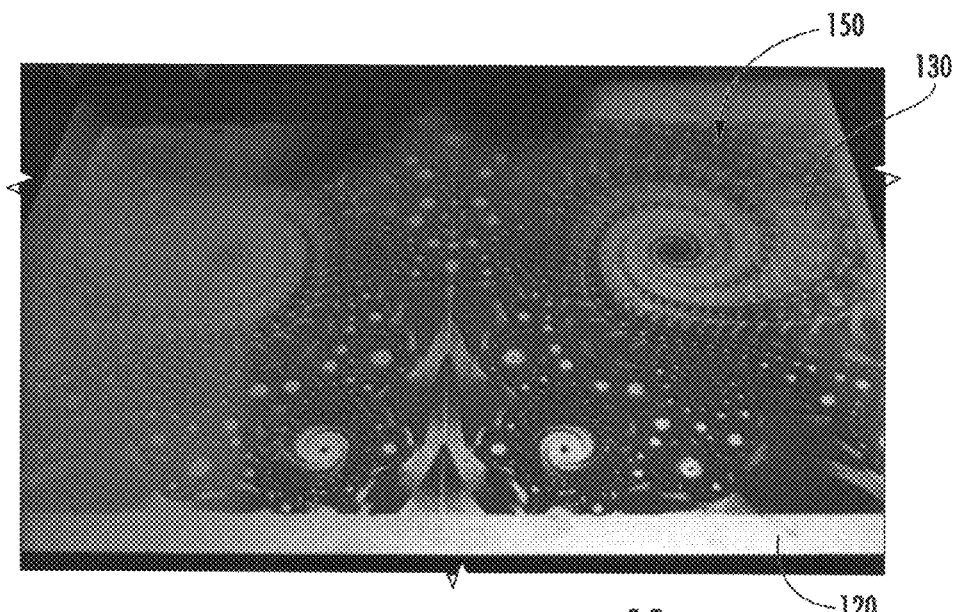
FIG. 11 is a perspective view of the substrate of FIG. 7 having a three-dimensional pattern of powder formed thereon via the print screen stencil.

FIG. 11 illustrates the substrate 120 having a three-dimensional pattern 150 of powder 130 formed thereon via the print screen stencil 110. The height of the deposited powder 130 is determined by screen mesh, half-tone image, number of passes, and the physical properties of the powder utilized. Coarse irregular particles of powder may be stacked higher than more spherical ones. Powder mixtures may be selected based in part on stacking properties. For example, dry beach sand is relatively spherical and does not stack very well. However, the type of sand used in cement is rough and irregular and, thus, is stackable. Experience with various material options will maximize the height of relief and precision achievable with this process. Additional relief height may be obtained by applying multiple layers of powder in accurate registration with the original part, and thermally fusing between applications.

The powder 130 may be selected from a wide range of materials which have the commonality of melting and flowing at elevated temperature. In some embodiments, the powder is a thermosetting plastic powder. Exemplary thermosetting plastic powders may include, but are not limited to, polyester powder, epoxy powder, urethane powder, silicone powder, polytetrafluoroethylene (PTFE) powder, and the like. In some embodiments, the powder is a thermoplastic powder. Exemplary thermoplastic powders may include, but are not limited to, polyvinyl chloride powder, nylon powder, acrylic powder, and the like. In some embodiments, the powder is an inorganic powder. Exemplary inorganic powders may include, but are not limited to, glass, ceramic, silica, metal, and the like.

A powder may be used alone or in combination with other powder(s). Powders are graded by mesh count, typically by what "screen" mesh the powder was passed through in sorting the powders by the powder manufacturer (i.e. a two hundred mesh particle size powder passes through a 200-mesh screen; no particle larger will pass through). According to embodiments of the present invention, the screen mesh used to produce an article with three-dimensional relief (i.e., a bas relief) has larger openings than the powder it will process. Many powders processed for commercial purposes are in the 200-300 mesh particle range. A screen mesh of 180 or coarser will work well with the particle size range.

Powders utilized in accordance with embodiments of the present invention may be selected from a wide range of meltable materials. Both thermoplastic and thermoset plastic powder may be utilized with embodiments of the present invention. In addition, organic materials like sugar and salt may be utilized with embodiments of the present invention. At much higher temperatures, inorganic materials, such as glass, silica (sand), and ceramic powders, may be utilized to produce beautiful and durable three-dimensional relief surfaces. At very high temperature ranges, (e.g., ≥1300° F.) metal powders may be used to create products which have traditionally been made with casting or embossing techniques. Powder utilized in accordance with embodiments of the present invention may be selected and mixed with other powders based on desired properties, both physical and aesthetic, of the desired three-dimensional topography. For example, a polymer-metal combination of powders will create a metallic topography. A hard ceramic topography may be created using ceramic powder.

Figure 12:
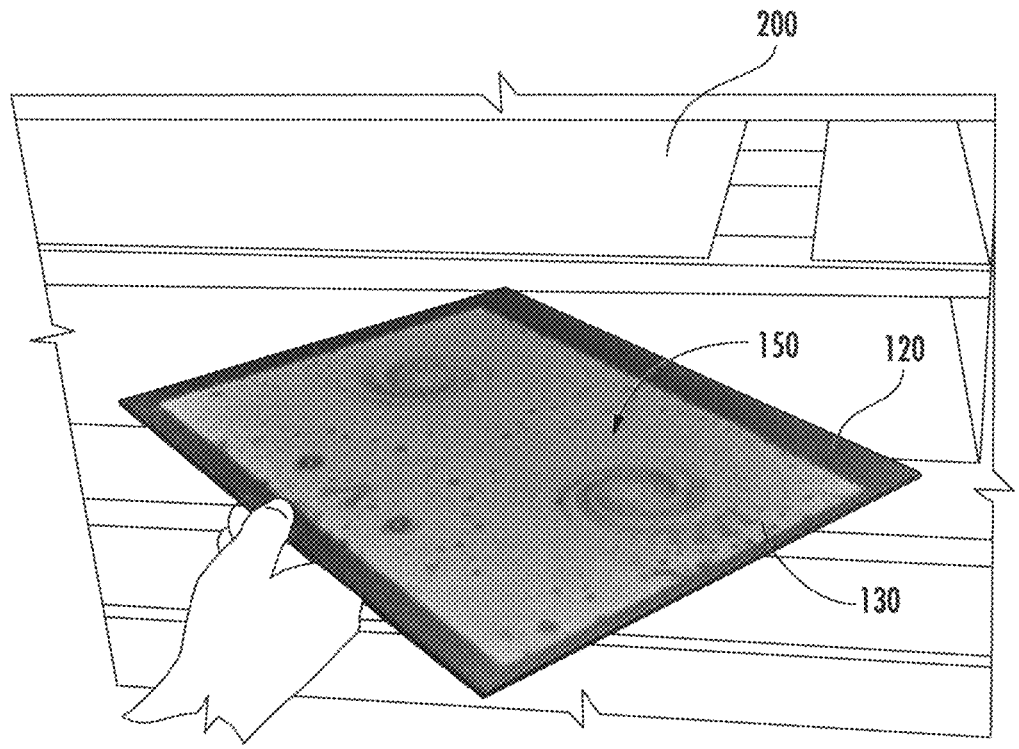
FIG. 12 illustrates placing the substrate of FIG. 11 into an oven to fuse the three-dimensional pattern of powder on the substrate into a three-dimensional relief.

Once the desired three-dimensional pattern 150 of powder 130 has been deposited on the substrate 120, the substrate 120 and the powder 130 thereon is subjected to thermal or radiant (UV, microwave, etc.) energy which melts and fuses the powder to itself and to the substrate 120 (Block 60, FIG. 1). For example, FIG. 12 illustrates a user placing the substrate 120 with the three-dimensional pattern 150 of powder 130 deposited thereon into an oven 200 to fuse the three-dimensional pattern 150 of powder 130 on the substrate into a three-dimensional topography 150R.

Figure 13:
FIG. 13 illustrates the substrate of FIG. 12 after being removed from the oven and with the fused three-dimensional relief thereon.
Figure 14:
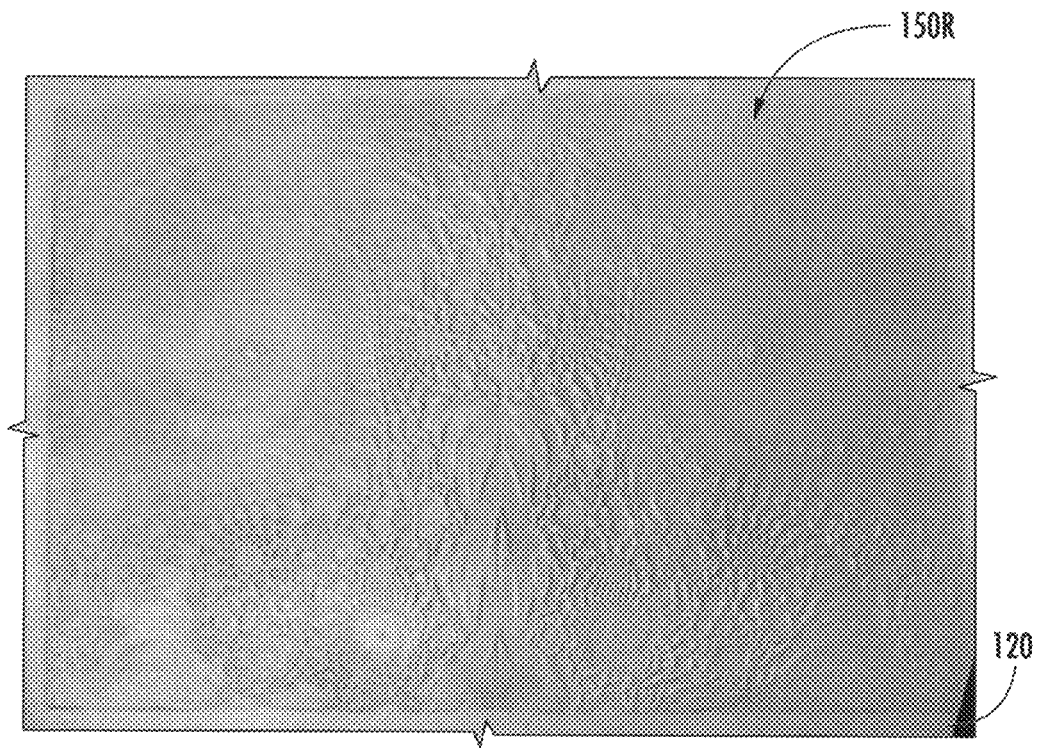
FIG. 14 illustrates the substrate of FIG. 13 with white paint applied to the three-dimensional relief thereon.

The assembly (substrate and fused powder) is then cooled and is ready for post processing. FIG. 13 illustrates the substrate with the fused powder 130 thereon in the three-dimensional topography 150R. In some embodiments, the three-dimensional topography 150R can be subjected to various finishing operations. Exemplary finishing operations include, but are not limited to, polishing, buffing, sanding, and/or chemical treatment. In some embodiments, a protective coating may be applied to the three-dimensional topography. In some embodiments a protective film may be applied and fused onto the three-dimensional topography 150R. Post processing in the case of metals or polymer metals may include polishing or machining. Surfaces may be painted or clear-coated. For example, the three-dimensional topography 150R is painted white in FIG. 14.

Figure 15:
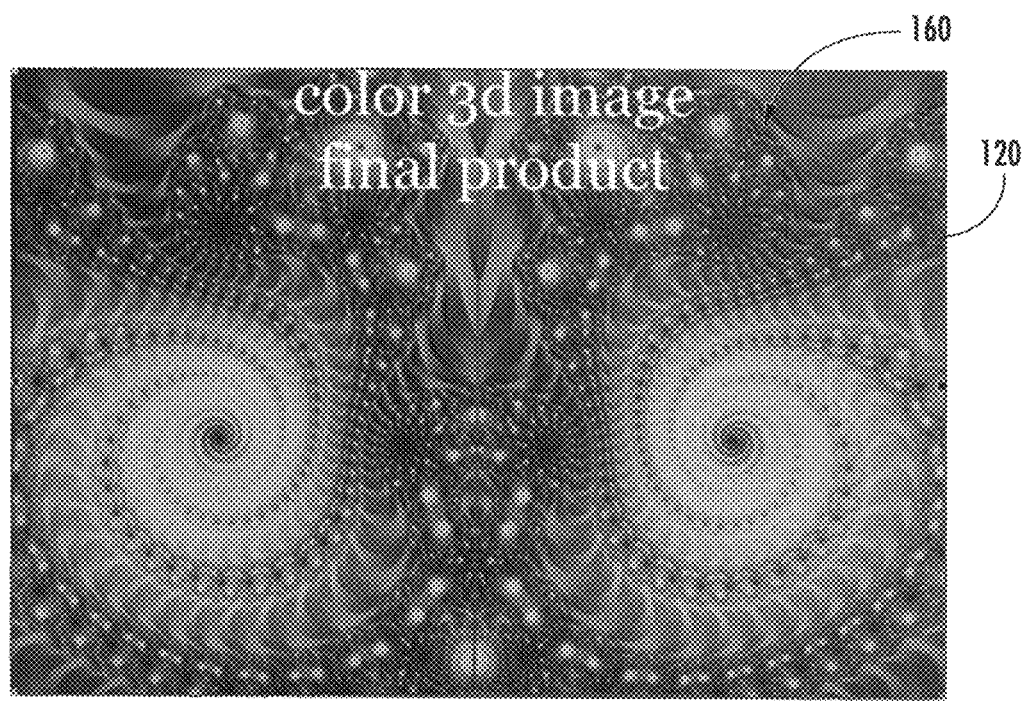
FIG. 15 illustrates the substrate of FIG. 13 with the color graphic image of FIG. 2 printed thereon.

According to some embodiments of the present invention, an image or other artwork may be printed onto the three-dimensional topography 150R. For example, the original image 100 (FIG. 2) which was used to create the gray-scale image 102 (FIG. 3) may be placed in accurate registration with the three-dimensional topography 150R. The resulting bas relief 160 is a three-dimensional version of the original image, as illustrated in FIG. 15. A direct printer, such as a flat-bed printer, may be used to print the image over the three-dimensional topography.

EXAMPLES

Example 1

A full color bas relief image of a rose is created using the following steps:

a) The product (i.e., the substrate on which a three-dimensional topography is to be created) is a full color decorative three-dimensional aluminum tile.

b) A high resolution digital image of a rose is selected. The image is imported into Photoshop® and the image is resized to the desired product size. (12"×12") This file is saved for future use.

c) The color image is converted to a gray-scale image. The gray-scale image is then manipulated using image tools known to the graphics industry, such as Photoshop®. The manipulation starts with the gray-scale image whose overall shapes and forms are consistent with the original art. Selected areas are enhanced and modified. Selected areas are made lighter or darker with the purpose of making areas darker where the intended bas relief will be taller and lighter areas where the relief will be shorter. The graphic artist works with the gray-scale like a sculpture works with clay to create a relief of the rose, who's defining geometries are consistent with the original image.

d) The gray-scale image is then converted to a half-tone bitmap image and printed on clear film to create a film positive image that is 12"×12".

e) A silk screen is prepared. The screen mesh is 155 mesh. The screen is coated with a UV Photosensitive emulsion and allowed to dry.

f) The photopositive film is place in intimate contact with the prepared screen. The assembly is then placed in a high intensity UV exposure unit. High intensity UV light passes the clear areas of the film and is blocked by the black half-tone dots. The UV light polymerizes the emulsion coating behind the clear areas of the film. The screen is then washed. The non-polymerized areas corresponding to the black dots are washed away, leaving the areas corresponding to the black dots as pass-through areas in the screen.

g) The screen is dried.

h) The screen is placed in parallel registration to a 12"×12" aluminum plate. The screen is maintained about ⅛" above the target part and in substantially perfect aspect registration.

i) A mixture is prepared of 1 part calcium carbonate and 2 parts white triglycidyl isocyanurate (TGIC) polyester powder (by volume). The mineral limits the flow of the TGIC powder when subsequently the part is exposed to heat.

j) Both powders are 200 mesh or finer, (suitable to pass through the 150 mesh screen).

k) The powder mixture is deposited on the screen and moved across the face of the screen with a doctor blade. The powder passes through the screen and is deposited on the target substrate. The volume of powder being deposited is metered by the half-tone "information". Thus, the half-tone translates the visual information of the gray-scale art into thickness of deposition. Multiple passes will increase the relief height of the powder topography being deposited while maintaining the proportionality of the "powder sculpture" being created. The height of the powder(s) is limited by the "stacking" nature of the selected powders.

l) The aluminum tile is transferred to an oven without disturbing the sculpted powder and heated to about 170° C. The TGIC polyester powder melts and fuses the three-dimensional topography to the substrate as well as fusing the calcium carbonate. Total oven time is about 15 minutes and then the assembly is removed and cooled. The tile now has a white three-dimensional topography which is a sculptural rendering of the original rose image.

m) The tile is placed in precise registration on a direct digital printer and the original image (full color) is printed on the three-dimensional topography.

n) The tile is then coated with a UV cure clear coat to protect the ink surface.

Example 2

Same steps as in Example 1, except the powder is 1 part bronze powder to 2 parts TGIC polyester powder, by volume. The powder mixture is screened onto a 12"×12" aluminum substrate. The assembly is moved carefully to the oven and cured as described in Example 1. The three-dimensional topography is mechanically polished. A bronze bas relief rose is created.

Example 3

Same steps as in Examples 1 and 2, except the target substrate is a clay tile. Bronze powder (no polymer) is screened onto a 12"×12" fired clay tile. The assembly is placed in a kiln. The kiln is placed in a chamber equipped to evacuate the air from the kiln and to replace it with nitrogen gas. Nitrogen is provided into the kiln at about 20 psi and the kiln is heated to 2200° F. Anaerobic conditions allow the bronze to melt and flow without discoloration due to oxidation. The assembly is cooled and removed. The bronze relief is then mechanically polished.

Example 4

Same steps as in Examples 3, except nitrogen is not used in the kiln, and the powder is clear glass powder applied through a prepared silkscreen onto a clear glass substrate. The glass with the powder relief is placed into a kiln. The kiln is heated to 1700° F. The powdered glass melts and bonds to the glass substrate. The glass is cooled slowly and removed from kiln. A three-dimensional relief is created and is permanently fused to the glass substrate.

Example 5

A full color dimensional glass image is created with the use of 4 half-tone screens which correspond to the red, blue, yellow and black components of the original rose photo. This process known to the graphics industry as "separations" is the basis for offset printing presses and inkjet printers. Coloration is based on the composite of the four colors. Silk screen printing such as is done on t-shirts also uses 4 color separations to create full color images. Four Screens are produced each corresponding to the separations of the original art. Each color is independently converted to grey scale and subsequently to half tone bitmap format. The images are "burned" onto the screens. A 12"×12" sheet of white glass is prepared. Each screen is then placed in registration (consecutively) over the target substrate. Glass powder of each color is doctor bladed thru the screens. The resulting assembly is placed in a kiln. The glass powder melts and fuses both to the substrate and to the other color glass powders. The glass panel is cooled slowly and removed from the kiln. A full color translucent glass image of the rose results.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A method of making a bas relief from a two-dimensional image, the method comprising:
   converting a two-dimensional image to a gray-scale image that comprises a plurality of shades of gray, wherein each shade of gray corresponds to a respective elevation of a three dimensional representation of the two-dimensional image;
   converting the gray-scale image to a half-tone bitmap image that comprises a plurality of dark dots on a light background, wherein each dark dot represents a respective pixel in the gray-scale image, and wherein each dark dot has a size that corresponds to a respective one of the shades of gray in which the respective pixel is located;
   etching the half-tone bitmap image onto a print screen stencil such that the print screen stencil has open mesh areas that correspond with the plurality of dark dots and closed mesh areas that correspond with the light background of the half-tone bitmap image;
   forcing meltable powder through the open mesh areas of the print screen stencil to form a three-dimensional pattern of powder on a substrate positioned beneath the print screen stencil in spaced-apart relationship therewith, wherein the three-dimensional pattern of the powder corresponds to the three-dimensional representation of the two-dimensional image;
   heating the three-dimensional pattern of powder to fuse the powder together to form a bas relief; and
   printing, in accurate registration, the two-dimensional image onto the bas relief to produce a three-dimensional version of the two-dimensional image.

2. The method of claim 1, wherein printing the two-dimensional image onto the bas relief is performed via a flat-bed printer.

3. The method of claim 1, wherein the lightest shade of gray represents a lowest elevation of the three dimensional representation, wherein the darkest shade of gray represents a highest elevation of the three dimensional representation, and wherein shades of gray in between the lightest and darkest shades of gray correspond to respective different elevations between the highest and lowest elevations.

4. The method of claim 1, wherein etching the half-tone bitmap image onto the print screen stencil comprises printing the half-tone image on a film to produce a positive rendering of the half-tone image, and then using the film to photographically etch the half-tone bitmap image onto the print screen stencil.

5. The method of claim 1, wherein the powder is a single homogenous material.

6. The method of claim 1, wherein the powder is a mixture of different powders, at least one of which is meltable.

7. The method of claim 1, wherein the powder is a thermosetting plastic powder.

8. The method of claim 7, wherein the thermosetting plastic powder is selected from the group consisting of polyester powder, epoxy powder, urethane powder, silicone powder, and polytetrafluoroethylene (PTFE) powder.

9. The method of claim 1, wherein the powder is a thermoplastic powder.

10. The method of claim 9, wherein the thermoplastic powder is selected from the group consisting of polyvinyl chloride powder, nylon powder, and acrylic powder.

11. The method of claim 1, wherein the powder is an inorganic powder.

12. The method of claim 11, wherein the inorganic powder is selected from the group consisting of glass, ceramic, silica, and metal.

13. The method of claim 1, wherein the powder is an organic powder.

14. The method of claim 13, wherein the organic powder is selected from the group consisting of sugar and salt.

15. The method of claim 1, wherein the powder is a mixture of at least two of thermosetting plastic powder, thermoplastic powder, inorganic powder, and organic powder.

16. The method of claim 1, further comprising applying a protective coating to the bas relief.

17. The method of claim 1, further comprising thermally fusing a film onto the bas relief.

18. The method of claim 1, further comprising subjecting the bas relief to one or more of the following finishing operations: polishing, buffing, sanding, and/or chemical treatment.

19. A method of making a bas relief from a two-dimensional color image, the method comprising:

converting the two-dimensional color image to four respective gray-scale images, each corresponding to a respective color, each comprising a plurality of shades of gray, wherein each shade of gray corresponds to a respective elevation of a three dimensional representation of the two-dimensional color image;

converting each of the four gray-scale images to four respective half-tone bitmap images that each comprise a plurality of dark dots on a light background, wherein each dark dot represents a respective pixel in the gray-scale image, and wherein each dark dot has a size that corresponds to a respective one of the shades of gray in which the respective pixel is located;

etching each of the four half-tone bitmap images onto four respective print screen stencils such that each print screen stencil has open mesh areas that correspond with the plurality of dark dots and closed mesh areas that correspond with the light background of the respective half-tone bitmap image;

forcing meltable powder through the open mesh areas of each print screen stencil separately to form a three-dimensional pattern of powder on a substrate positioned beneath the print screen stencil in spaced-apart relationship therewith, wherein the three-dimensional pattern of the powder corresponds to the three-dimensional representation of the two-dimensional image;

heating the three-dimensional pattern of powder to fuse the powder together to form a bas relief; and printing, in accurate registration, the two-dimensional image onto the bas relief to produce a three-dimensional version of the two-dimensional image.

20. The method of claim 19, wherein the lightest shade of gray represents a lowest elevation of the three dimensional representation, wherein the darkest shade of gray represents a highest elevation of the three dimensional representation, and wherein shades of gray in between the lightest and darkest shades of gray correspond to respective different elevations between the highest and lowest elevations.

\* \* \* \* \*